(12) United States Patent
Laval et al.

(10) Patent No.: US 8,478,504 B2
(45) Date of Patent: Jul. 2, 2013

(54) SKID STEER MACHINE WITH AUTOMATIC OPERATING RATIO CHANGE SYSTEM

(75) Inventors: Vincent Laval, Chambery (FR); Renaud Laperriere, Aix les Bains (FR)

(73) Assignee: Volvo Compact Equipment SAS, Belley (FR)

( * ) Notice: Subject to any disclaimer, the term of this patent is extended or adjusted under 35 U.S.C. 154(b) by 341 days.

(21) Appl. No.: 13/122,576

(22) PCT Filed: Oct. 23, 2008

(86) PCT No.: PCT/IB2008/003395
§ 371 (c)(1),
(2), (4) Date: Apr. 5, 2011

(87) PCT Pub. No.: WO2010/046723
PCT Pub. Date: Apr. 29, 2010

(65) Prior Publication Data
US 2011/0191003 A1    Aug. 4, 2011

(51) Int. Cl.
*G06F 19/00* (2011.01)
(52) U.S. Cl.
USPC .............. 701/99; 172/817; 172/812; 172/795
(58) Field of Classification Search
USPC ............... 701/99, 42; 73/115.08; 180/411, 180/305, 165, 9.1; 172/817, 812; 37/348; 414/680; 440/58; 60/442, 444, 329
See application file for complete search history.

(56) References Cited

U.S. PATENT DOCUMENTS

| | | | |
|---|---|---|---|
| 6,119,456 A * | 9/2000 | Louis et al. | 60/444 |
| 6,662,556 B2 * | 12/2003 | Bares et al. | 60/422 |
| 6,766,236 B1 | 7/2004 | Lamela et al. | |
| 6,840,334 B2 * | 1/2005 | Marquardt | 172/812 |
| 7,080,475 B2 | 7/2006 | Chirnomas et al. | |
| 2004/0079541 A1* | 4/2004 | Marquardt | 172/817 |
| 2007/0240928 A1* | 10/2007 | Coltson et al. | 180/411 |
| 2008/0161999 A1* | 7/2008 | Davis et al. | 701/42 |
| 2008/0162000 A1* | 7/2008 | Dattilo et al. | 701/42 |

FOREIGN PATENT DOCUMENTS

| | | |
|---|---|---|
| EP | 1803630 A | 7/2007 |
| EP | 1918463 A | 5/2008 |
| WO | 02066311 A | 8/2002 |

OTHER PUBLICATIONS

International Search Report for corresponding International App. PCT/IB2008/003395.

* cited by examiner

*Primary Examiner* — Behrang Badii
(74) *Attorney, Agent, or Firm* — WRB-IP LLP (57) ABSTRACT

A skid steer machine having separate left and right hydraulic propulsion units includes an operating ratio change system by which the ratio of the propulsion speed of at least one of the hydraulic propulsion units versus the hydraulic flow directed to the propulsion units can be changed from at least a first ratio to a second ratio and inversely. The operating ratio change system includes an operating ratio change ECU which controls an operating ratio change device to operate in at least a first ratio configuration or a second ratio configuration, and the operating ratio change system operates in an automatic operating mode where the operating ratio change ECU selects the operating ratio according to machine parameters received by the operating ratio change ECU.

14 Claims, 5 Drawing Sheets

SKID STEER MACHINE WITH AUTOMATIC OPERATING RATIO CHANGE SYSTEM

BACKGROUND AND SUMMARY

The invention relates to skid steer machines, and more especially to compact skid steer loaders.

Skid steer machines are commonplace in the field of construction equipment machinery. A skid steer machine can be defined by the fact that it comprises at least a left propulsion unit and a right propulsion unit which can be controlled independently in terms of their propulsion speed and of their propulsion direction, i.e. whether they operate forwardly or rearwardly. Therefore, on such machines, the left or right movements of the machine come as a consequence of a difference in the speed of the left and right propulsion units, and those machines can therefore be dispensed of any dedicated steering mechanism such as deflectable wheels.

One major advantage of skid steer machines is that they can easily achieve on-the-spot turns which make them very maneuverable. In the field of compact construction equipment machines, excavators and loaders are often built as skid steer machines. Skid steer excavators usually have propulsion units equipped with endless tracks. On the other hand, compact skid steer loaders are most often equipped with two wheels on each side of the machine, each pair of wheels on one side of the machine being non-deflectable and driven synchronously by the same propulsion unit, although skid steer loaders equipped with endless tracks are also found.

Whereas excavators are mostly static machine, that is to say that in a typical working cycle the machine is not significantly displaced, skid steer loaders are essentially machines which are used to carry loads from one place to another. Therefore, the typical work cycle of a loader is to pick up a load, to move from a first location to a second location, to discharge the load, and to come back from the second location to the first location to pick up the next load. Therefore, if the two locations are at some distance one from the other, there is an evident incentive to be able to travel as quickly as possible from one location to the other. On the other hand, when the machine arrives either at the first location or the second location, it needs to arrive slowly to insure a precise handling of the machine. Also, when carrying heavy loads on steep grades, the power needed for displacing the machine might become important with respect to the available power output of the engine driving the machine, especially in compact machines where only a small engines can be fitted.

Skid steer machines are most often equipped with so-called hydrostatic transmissions. More precisely such transmissions comprise a variable capacity pump which is hydraulically connected in closed-circuit to a hydraulic motor. In some cases, the hydraulic motor is of the variable capacity type but, the hydraulic motor is often of a fixed capacity type. For a given pressure of fluid delivered by the pump, which will determine the torque delivered by the motor, and for a determined capacity of the motor, the speed of the motor will be directly linked to the flow of hydraulic fluid delivered by the pump to the motor. One can determine an operating ratio as being the ratio between the propulsion speed of the propulsion units and the flow of hydraulic fluid delivered by the pump to the motor.

It is known in the industry to have means for varying this operating ratio. For example, the hydraulic motor could be of the type having a variable capacity. Another possibility is to have some kind of a mechanical gearbox between the motor and the wheels or the endless track of the propulsion unit. Into more simple arrangement, there are commercially available hydraulic motors which have inherently a fixed capacity but wherein the displacement of the motor can nevertheless be easily changed. An example of such motors is a radial piston motor where the pistons can be partially deactivated. An example of such motors is the MCR range of radial piston motors available from the Bosch Rexroth company. In those motors, a fluid pressure signal can be used to deactivate partly the pistons of the motor so as to in effect divide by two the instantaneous effective capacity of the motor. By dividing the motor capacity by a factor of two, it is possible, for the same of fluid pressure delivered by the pump, to double the speed of the motor. On the other hand, this decreases also by a factor of two the mechanical torque available on the output shaft of the motor. It should be mentioned the dividing factor may be other than two.

Therefore, in the context of a skid steer machine it is desirable to provide the propulsion units with the means to change the operating ratio depending on which parts of its work cycle it is operating in. On the other hand, this should be achieved through a system both inexpensive and easy to operate for the machine's operator.

An aspect of the invention provides for a skid steer machine having separate left and right hydraulic propulsion units, wherein the machine comprises an operating ratio change system by which the ratio of the propulsion speed of at least one of the hydraulic propulsion units versus the hydraulic flow directed to the propulsion units can be changed from at least a first ratio to a second ratio and inversely, characterized in that the operating ratio change system comprises an operating ratio change ECU which controls an operating ratio change device to operate in at least a first ratio configuration or a second ratio configuration, and in that the operating ratio change system operates in an automatic operating mode where the operating ratio change ECU selects the operating ratio according to machine parameters received by the operating ratio change ECU.

DESCRIPTION OF FIGURES

The following description of the invention will be best to read in conjunction with the appended drawings in which.

DETAILED DESCRIPTION

Figure 1:
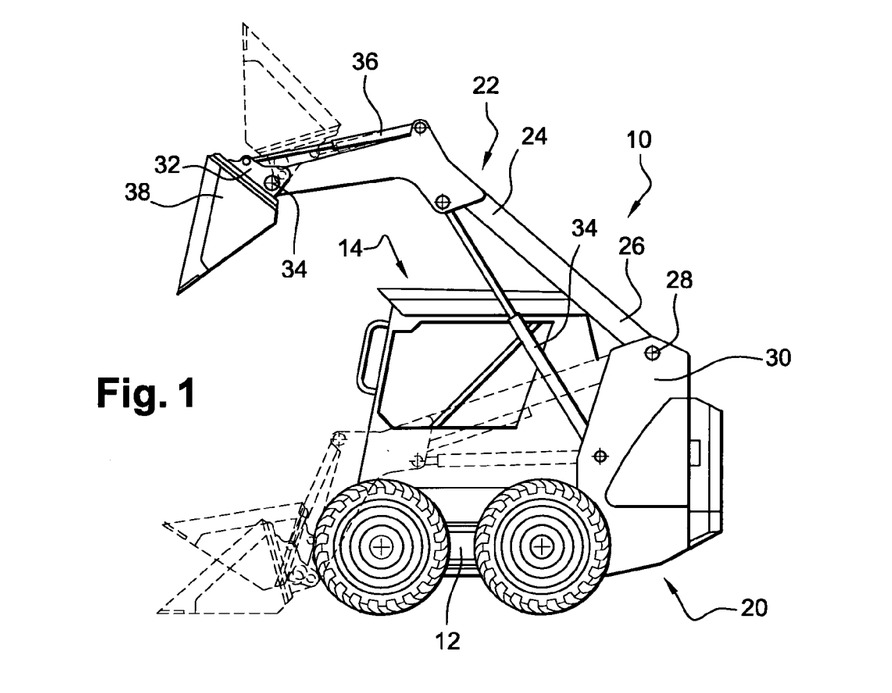
FIGS. 1 and 2 are a schematic view of a compact skid steer loader, respectively viewed from the side and from the top.
Figure 2:
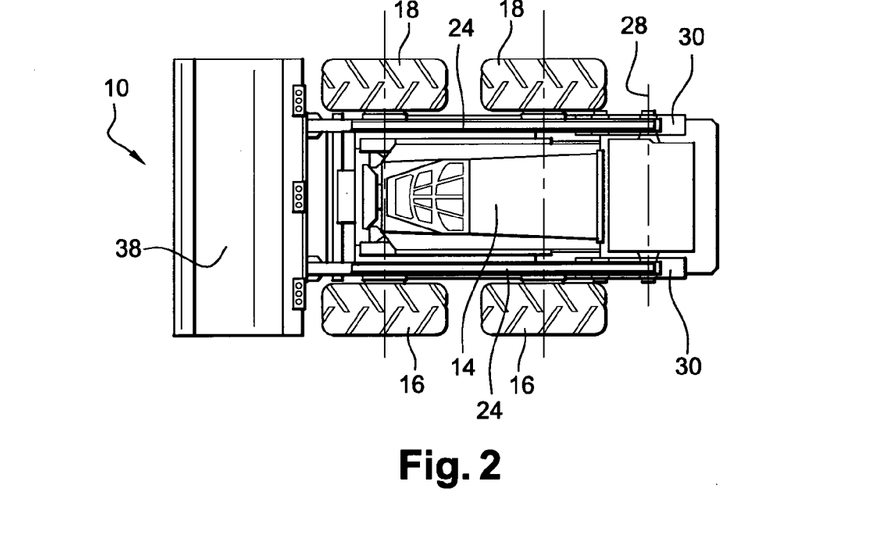

On FIGS. 1 and 2 is shown a conventional compact skid steer loader. A compact skid steer loader 10 has a short chassis 12 on top of which is arranged a cabin 14 for accommodating an operator. In this embodiment, the skid steer loader is a wheeled machine having a left pair of wheels 16 and a right pair of wheels 18. Being a compact machine, the front wheels of the machine that are approximately located vertically under the front end of the cabin 14 and the rear wheels are located approximately under the rear end of the cabin 14. The chassis 12 has a rear overhang 20 for accommodating the engine of the machine. According to a very distinctive feature of compact loaders, the machine 10 has a loader boom 22 which comprises a pair of loader arms 24 oriented longitudinally and which are articulated at their rear extremity 26 around a horizontal axis 28 on rear vertical pillars 30 which extend upwards on both lateral sides of the rear overhang 20. In machines know as "radial lift", the loader arms 24 are articulated at the top extremity of these vertical pillars 30, which is approximately above the mid-height of the cabin 14. The loader arms 24 extend forwardly on both sides of the cabin 14 towards the front of the machine. At their front extremity, the loader arms 24 are usually equipped with an attachment plate 32 which is pivotally connected to the loader arms 24 around an horizontal axis 34. Therefore, the attachment plate 32 extends transversally across the width of the machine in front of the cabin 14, of the chassis 12 and of the front wheels. The loader arms 24 are actuated by a pair of arms cylinders 36 to displace the loader arms 24 from a low position shown in solid lines on FIG. 1 to a high position showed in dashed lines. The arms cylinders 36 are for example connected by one extremity to the rear pillars 30 and at their other extremity to an intermediate part of the loader arms. Similarly, the attachment plate 32 can be actuated by two attachment plate cylinders 36 between the high position and a low position. On the attachment plate 32, it is possible to adapt various attachments depending on the work to be performed. On FIGS. 1 and 2, the attachment is a conventional loader bucket 38. The invention would also apply to so-called "vertical lift" machines where the loader arms are not simply articulated but connected at their rear extremity to the rear end of the machine through a multilink mechanism.

The compactness of such machine is due mainly to the machine being almost entirely comprised within the length of its loader boom 22. Indeed, the engine, the cabin 14, the chassis 12 and the wheels 16, 18 are almost entirely comprised within the length between the rear and front extremity of the loader boom 22.

The skid steer feature of the machine derives from the way its propulsion and its steering is achieved. In a skid steer machine, the propulsion is achieved thanks to separate left and the right propulsion units. Each propulsion unit has its own motor, its own transmission, and its own ground engaging element. The ground engaging element is, in the case of the embodiment show on FIGS. 1 and 2, a pair of synchronous wheels, that is to say a pair of wheels which are of the same diameter and which are at all times driven at the same speed in the same direction. In most cases, the motor is a hydraulic, motor which drives both wheels, for example through a chain drive. The motor could also be an electric motor and/or it could be provided one motor for each wheel. Also, while the ground engaging element is here represented as a pair of wheels, it could be well replaced by an endless track mechanism. Except in some particular machines, the ground engaging elements are non-deflectable so that there is no need to provide for a steering mechanism. The steering of the machine is simply achieved a by controlling the left in the riot propulsion units at the same speed to drive straight in the forward or rearward direction, or by controlling the difference in speed of the left and right propulsion units to drive the machine to the left or to the right. In most cases, it is even possible to have one propulsion unit driven at a given speed in one direction while the other propulsion unit is driven at the same speed in the reverse direction so as to achieve on-the-spot turn of the machine. Such maneuverability is possible due to the relatively short wheelbase of the machine.

Figure 3:
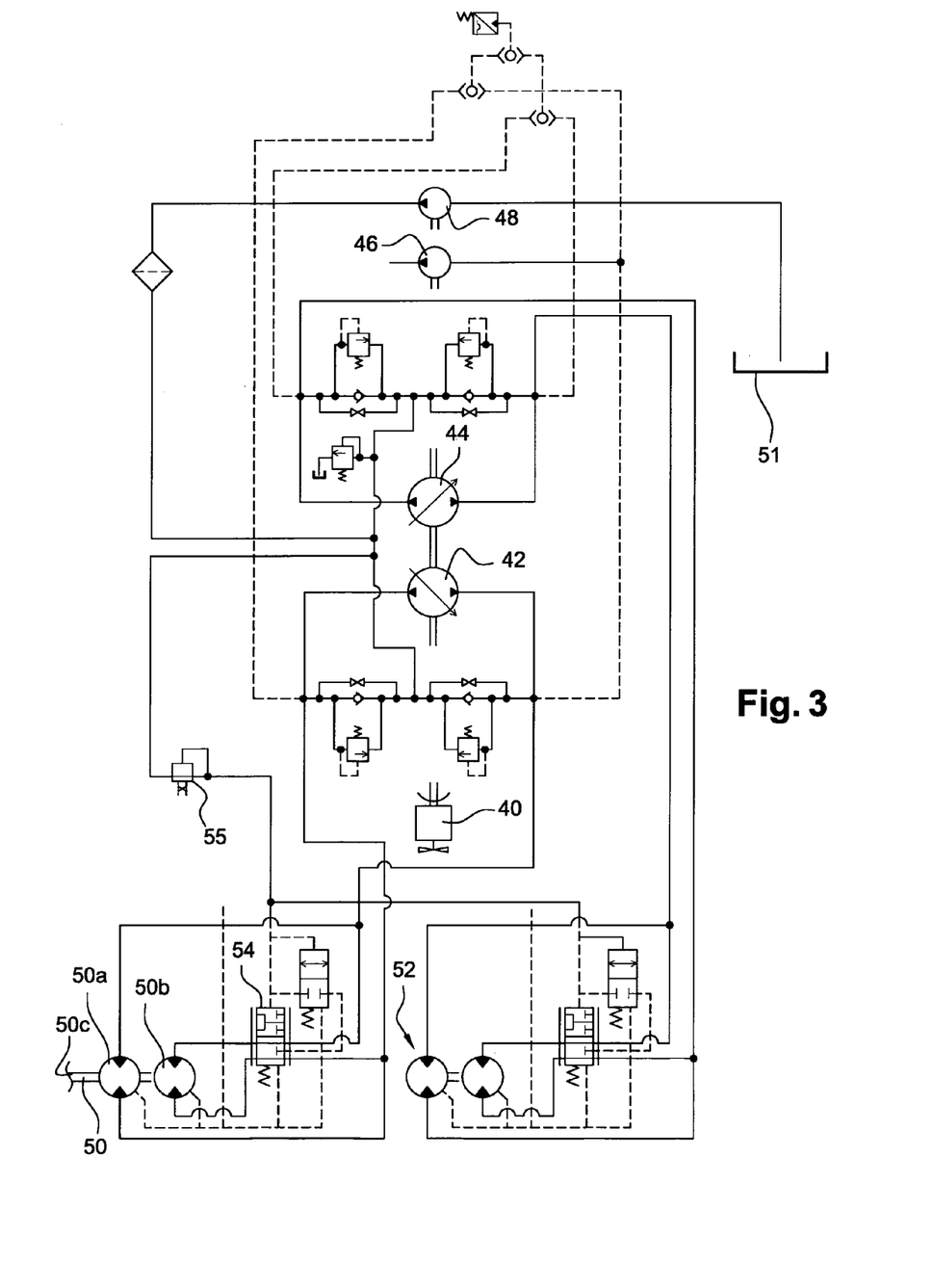
FIG. 3 is a schematic diagram representing the main components of a hydraulic circuit for the travel gear of the skid steer loader.

It is represented on FIG. 3 a diagram showing some of the components participating in the control of the machine's travel. A number of components which are not directly necessary for the understanding of the main structure of this travel system have been omitted for the sake of clarity.

The travel system comprises him an engine 40 which drives two primary pumps 42, 44 and two secondary pumps 46, 48. The two primary pumps 42, 44 are variable displacement pumps and are for example embodied as an axial piston variable displacement double pump as sold by the Bosch Rexroth company as the A20 series, for example an A20VO model pump. The primary pumps are dedicated to providing hydraulic fluid under pressure to respectively a left motor 50 and a right motor 52 to drive to the left and right set of wheels respectively. Therefore, each one of the variable the capacity pumps 42, 44 is hydraulically connected in closed circuit to the respective hydraulic motor 50, 52. The secondary pump 48 is a feeding pump for feeding the closed circuits with enough hydraulic fluid from a hydraulic tank 51. Various means are provided to regulate and balance the pressure in the closed circuits but will not be described here in detail.

The hydraulic motors 50, 52 are identical so that only one of them will be described. The motors are preferably radial piston hydraulic motors having the ability to work either in a full displacement configuration or in a partial displacement configuration. An example of such motors is the MCR range of radial piston motors available from the Bosch Rexroth company. Although not shown on FIG. 3, the displacement of primary pumps 42, 44 can be controlled through any type of pilot control circuit known to the man of the art, either mechanical, purely hydraulic, electric or electro-hydraulic. The ratio between the full displacement and the partial displacement may be a factor two, the partial displacement being thus a half displacement. Nevertheless, other ratios could be used.

On FIG. 3, the hydraulic motor 50 is represented as two parallel motors 50a, 50b although this illustration is only for the purpose of the diagram. Basically, it is considered that one part of the motor, for example part 50a, is hydraulically permanently connected in closed circuit to the primary pump 42. The other part 50b of the motor is represented as being selectively hydraulically connected to the same primary pump 42, in parallel to the other part 50a, through a displacement control proportional valve 54.

The displacement control proportional valve 54 is hydraulically controlled through a pilot pressure delivered by a soft shifting electro-proportional valve 55. If the pilot pressure delivered by the electro-proportional valve 55 is nil, the displacement control valve 54 sets the second part 50b of the motor 50 in hydraulic communication with the primary pump 42. In this first configuration, the motor 50 operates with its full displacement, thus being able to deliver its maximum torque. If the pilot pressure delivered by the electro-proportional valve 55 is above are certain threshold, the displacement control valve 54 isolates the second part 50b of the motor from the primary pump 42 so that part 50b of the motor does not contribute torque to the output shaft 50c of the motor. In this second configuration, the motor 50 operates with only half of its nominal displacement, therefore being able to deliver only half of its nominal torque, but being then able, for a given that flow of hydraulic fluid delivered by the primary pump 42, to operate at a speed double than that which would be achieved in the first configuration. Thanks to the valves 54 and 55 being proportional, it is possible to shift smoothly from the one configuration to another of the motor so as to avoid any undue stress on the hydraulic components and any undue jerk experienced by the machine and its driver. Details about these motors and the associated commercially available soft shifting technology can be obtained in the U.S. Pat. No. 7,080,475 or from the Rexroth company.

It derives from the above that the ratio between the speed of the output shaft 50c of the motor 50 and the flow of hydraulic fluid delivered by the primary pump 42 depends on the configuration of the system. Indeed, the ratio in the first configuration will be half of that in the second configuration. Therefore, in the embodiment above, the valves 54, 55, together with the dual capacity motor 50 are components of an operating ratio change device in the context of the invention.

According to the invention, the skid steer' machine comprises an operating ratio change system comprising an operating ratio change ECU which controls the operating ratio change device to operate in at least a first ratio configuration or a second ratio configuration. This ECU is able to operate an automatic operating mode where the operating ratio change ECU selects the operating ratio according to machine parameters received by ECU.

Figure 4:
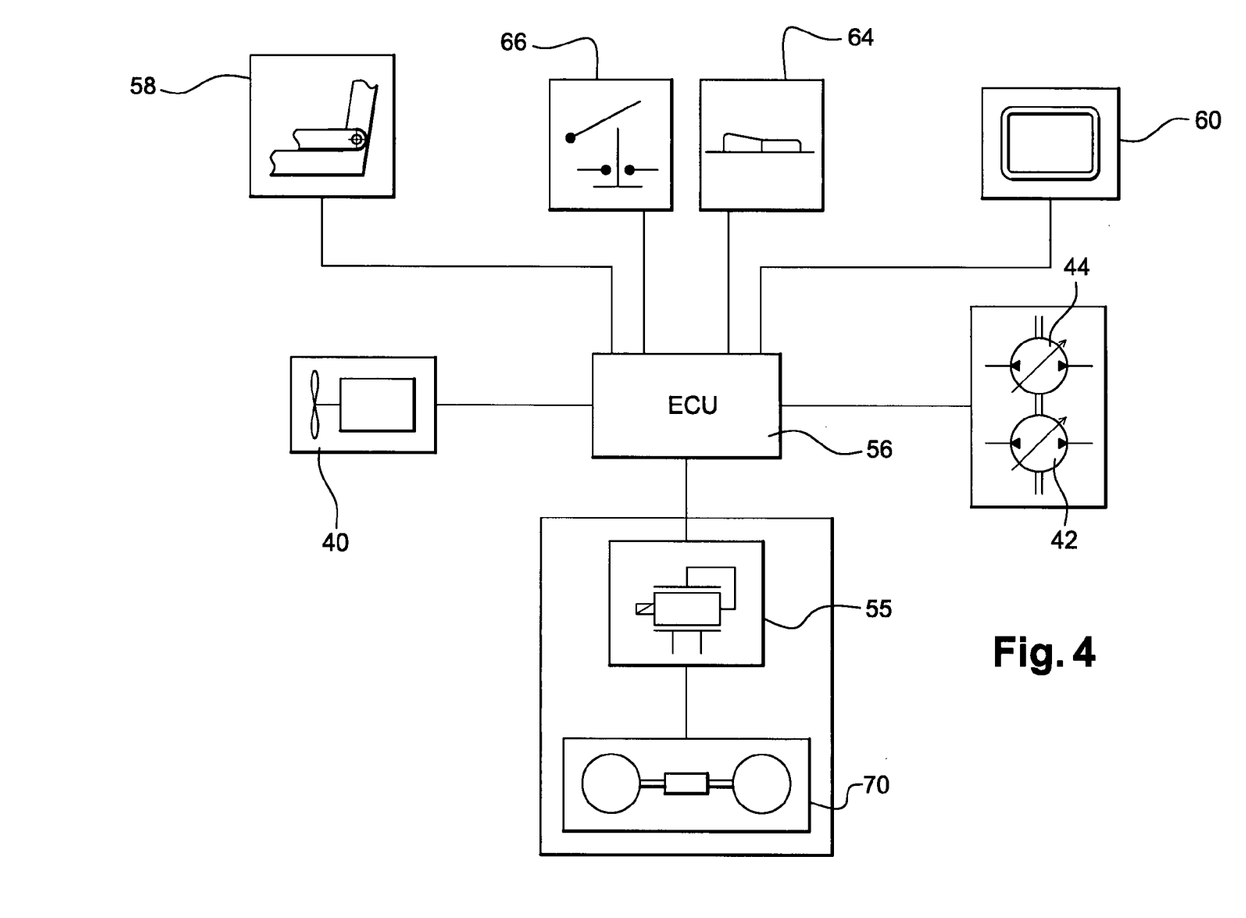
FIG. 4 is a schematic diagram representing the main components related to an operating ratio change system according to the invention.

One example of an operating ratio change system according to the invention is depicted in FIG. 4. Central to the invention is an electronic controlled unit, ECU 56 which controls the operating ratio change device. In the example depicted in FIG. 3, ECU 56 can for example drive directly or indirectly the soft shifting valve 55 which itself will control valve 54 and therefore the capacity of the motor 50 of the corresponding propulsion unit 70. In FIG. 4, the operating ratio change ECU 56 is depicted as a separate and unitary ECU. Nevertheless, as it is well known to the skilled man in the art, this ECU could in fact be a part of an ECU performing several tasks, or it could be divided into several physical ECU's each performing subtasks of the operating ratio change control.

Therefore, the operating ratio change ECU 56 could be physically implemented as being part of one or several already existing ECUs, with the corresponding inputs, outputs, memory, processing means, and software.

According to the invention, the ECU will be able to select the most preferable operating ratio according to various machine parameters. In FIG. 4, it is a therefore represented the case where the ECU 56 is electronically connected to various components of the machine, such as:

the engine 40, for example to retrieve information related to the torque delivered by the engine, for example expressed as a percentage of the nominal available torque at a given speed, related to its a rotation speed, related to its coolant and/or lubricant temperature, etc.; —the primary pumps 42, 44, for example to retrieve information related to their rotation speed, their instant capacity setting, the pressure and/or the temperature and/or the flow of a hydraulic fluid delivered by the pumps, etc.

an operator presence detection means such as a seat bar switch 58 or a seat incorporated weight detector; —a display means 60;

various switches, selectors, dials, etc. by which an operator can input data or instructions to be used by the ECU 56.

Depending on the sophistication of the automatic mode to be performed, the ECU 56 would need to be connected to one or several of the components listed above or to other components not shown on FIG. 4. ECU 56 will be able to electronically communicate with each of these components either directly or indirectly, most often with an ECU managing these components. Communication can be achieved through dedicated wired links, through a shared data bus such as a CAN-bus, or through wireless communication means.

In an exemplary embodiment of the invention, the operating ratio change ECU will be able to compute the preferred operating ratio by taking into account information relative to one or several of:—the hydraulic pressure delivered by one or several hydraulic pumps feeding the hydraulic propulsion units;

the torque delivered by an engine driving hydraulic pumps;
the hydraulic fluid temperature and/or viscosity;
the engine speed; —the difference between the effective engine speed and an engine speed set-point.

It could also be provided that the preferred operating ratio be computed taking into account some kind of operator input; For example, depending on the type of work he is doing, or simply on his preferences, or on a specific parameter he would like to optimize (such as fuel consumption, the operator of the machine may which be provided with means for input some information which will affect the computed preferred operating ratio. Also, the computed preferred operating ratio could take into account the presence of, a specific attachment on the machine, for example to adapt the ratio changing conditions to that specific attachment, or to lock the operating ratio change system into a predefined ratio.

In an exemplary embodiment of the invention, the ECU shall be programmed to automatically change the operating ratio from the first ratio to second ratio whenever the hydraulic fluid pressure delivered by the primary pumps 42, 44 remains lower than a first pressure threshold P1 for a duration of at least T1. It shall change the operating ratio from the second ratio to the first ratio whenever the hydraulic fluid pressure delivered by the primary pumps remains higher than a second pressure threshold P2 for a duration of at least T2, and if at the same time the instant workload of the engine, for example expressed as a percentage of the nominal available torque, is below a certain threshold. As an order of magnitude, it could be considered that, in the case of a nominal hydraulic pressure delivered by the pumps of up to 325 bars, the first pressure threshold P1 could be comprised between 130 and 180, for example 160 bars, and the second pressure threshold P2 could be comprised between 280 and 310 bars, for example 295 bars. The duration T1 or T2 could be comprised between 0.2 and 2 seconds, for example at least 0.5 seconds. The maximum engine workload for allowing ratio to be changed from first to second ratio could for example be 85 percent.

In an enhanced' embodiment of the invention, it will be provided for the machine to be able to temporarily override the fully automatic operating mode described above in order to force the machine to set itself in one of the ratios, for example the first ratio corresponding to a slower displacement of the machine. Such function would be very useful when the operator is performing a work which requires precision and/or a constant travel speed. To that effect, the operating ratio change system should comprise a ratio locking selector electronically connected to the ECU 56 to force the operating change device into one particular ratio configuration. Such a selector could be any kind of input device to the ECU and can simply be a biased switch such as a pushbutton sending an electrical pulse to the ECU. Upon receiving the information that the ratio change device should be locked in the first ratio; the ECU could first check whether the ratio change device is yet in its second or first configuration. If it is in the first configuration, the ECU should then simply prevent any change of the ratio, thereby locking it in first ratio. If it is in the second configuration, the ECU 56 should then force the gear change device to switch from its second configuration to its first configuration, and then to prevent any change of the ratio. Upon a further event, the ECU 56 could resume to full automatic operation mode. Such a further event could be a further input by the machine operator, for example a further activation of the same pushbutton acting as a ratio locking selector, or an event such as the shutdown of the machine.

In a further enhanced embodiment of the invention, the operating or ratio change system can be configured to operate also in a manual operating mode wherein it is the machine operator which selects the operating ratio to be implemented. In such a case, the system can comprise an operating ratio selector which is electronically connected to the operating ratio change ECU to shift the operating ratio change device from its first ratio configuration to its second ratio configuration or inversely. As for the ratio locking selector described above, the operating ratio selector could be any kind of input device usable by the machine operator. For example, it can be implemented as a biased switch such as a pushbutton sending an electrical pulse to the ECU.

Preferably, in the case where the operating ratio change system is able to operate either in manual mode or in automatic mode, this system will be equipped with an operating mode selector which is the electronically connected to the operating ratio change ECU to select either the manual operating mode or the automatic operating mode. As for the ratio locking selector described above, the operating ratio selector could be any kind of input device usable by the machine operator. For example, it can be implemented as a toggle switch 64 as represented schematically in FIG. 4. Being a function which may used to less frequently by of the operator, the operating mode selector could instead comprise a generic point and select device or a keypad by which the machine operator can select on a screen a function to be activated. The operating mode selector can be also embodied as part of a touch screen device.

In a case where the machine is equipped with an operating ratio change system performing both automatic and manual mode, and with an operating mode selector, it is possible to provide that the operating ratio selector, essentially used in manual mode, and the ratio locking selector, essentially used in automatic mode, are implemented as a single combined operating ratio and ratio locking selector. As stated above, such combined selector 66, as it is represented on FIG. 4, can comprise a simple biased switch.

Preferably, the operating ratio selector and the ratio locking selector should be easily accessible to the machine operator while operating the machine. Given that a compact skid steer lower is usually driven through manipulation of two joysticks, one by the left hand and the other by right hand of the driver, it would appear to be most convenient that either or both of those selectors is located on one of the joystick or very close to the joysticks, or located in such a way as to be activated by the foot of the operator, such as a foot actuated push-button. In the latter case, it can be provided that the selector is actuated through a pedal. Of course, this applies also if both selectors are combined in a single selector.

In a further enhanced embodiment of the invention, it can be provided that the status of the operating ratio change system is fed back to the machine operator. Preferably, this feedback is achieved through some kind of visual display system. While in FIG. 4 a screen display is shown, the display system could for example be embodied as a system of several LEDs each indicating an off/on status. For example the following information can be displayed at to the driver:

whether the system the is in automatic or manual mode;
whether the system is in the first ratio or second ratio;
whether the system is locked in one ratio.

Figure 5:
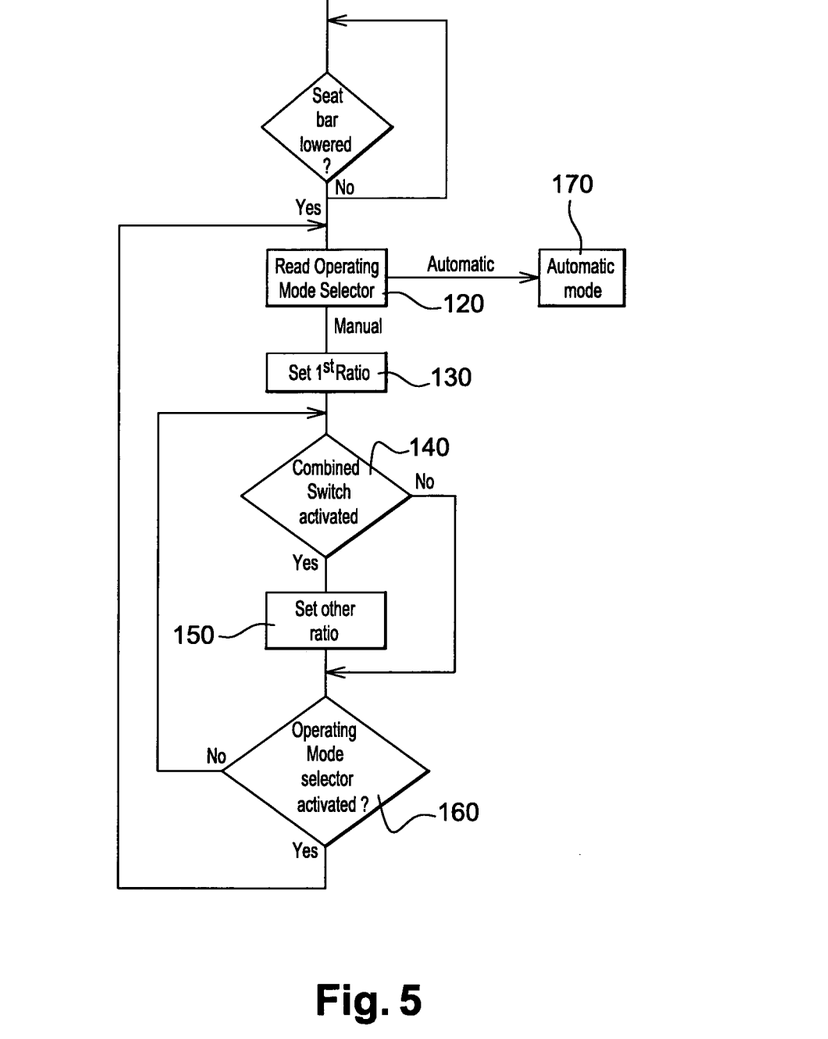
FIGS. 5 and 6 are schematic flowcharts representing the main functions performed by the system according to the invention.
Figure 6:
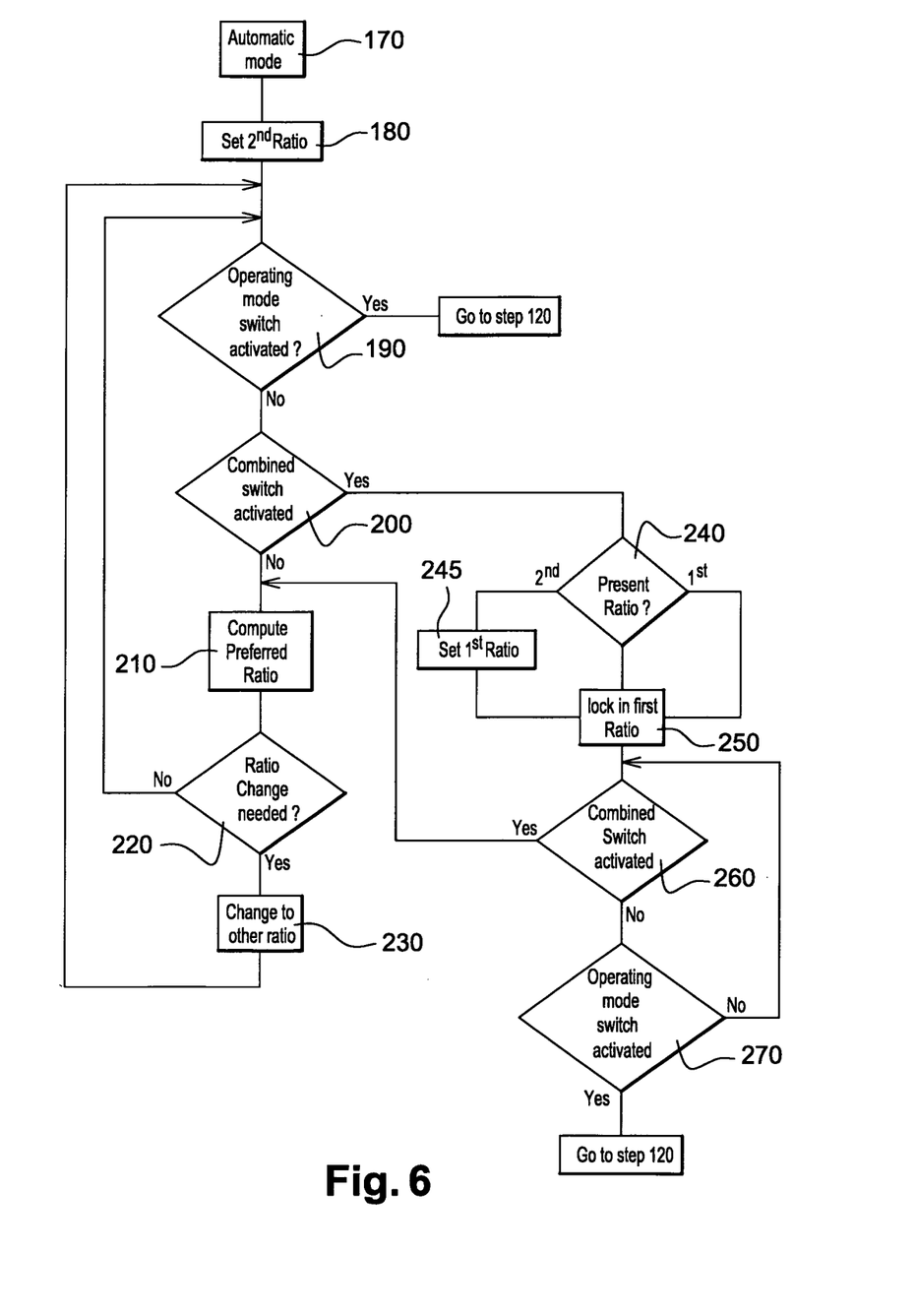

On FIGS. 5 and 6 is shown a flow chart describing the possible functioning of the operating ratio change system according to the invention. This flow chart is provided in view of clarifying the operating ration management process and may not be entirely representative of how the skilled man in the art would program the operating ratio change ECU. This flow chart would be applicable to an operating ratio change system as depicted on FIG. 4.

At step 110, the ECU 56 would retrieve the information from the seat bar switch 58, or any other occupant detection system, as to whether the driver is on board the machine.

Indeed it would seem optimal to have the system reset at each time the machine is restarted, and it is conventional to provide that a seat occupant detection system stops the machine whenever no occupant is detected and allows the machine's hydraulics to be started only when an occupant is detected.

At step 120, the ECU 56 can retrieve the status of the operating mode selector which can be either in its automatic or manual modes position.

In case the operating mode selector is in manual mode, it is provided that, at step 130 the operating ratio change system systematically controls the operating ratio change device to its first ratio configuration. Preferably, it is indicated to the driver on screen 60 the fact that the system is set in its manual operating node and the fact that the first of operating ratio is active. After that, at step 140 it is checked regularly whether the combined switch 66 is activated by the operator or not. If it is detected that the combined switch 66 is activated, the operating ratio change ECU 56 controls the device to be set in its other ratio at step 150, the new ratio is shown to the driver on the display 60, and the system proceeds to step 160. If, at step 140, no action on the combined switch 66 is detected, the system proceeds directly to step 160. At step 160, it is checked whether the operating mode selector is activated or not. If not, the system resumes to step 140. If yes, the system resumes to step 120.

In case the operating mode selector is in automatic mode when its status is retrieved at step 120, the system goes to step 170, and directly to step 180. Here, it can be provided for example that the operating ratio change system systematically controls the operating ratio change device to its second ratio configuration. Preferably, it is indicated on screen 60 both that the automatic operating mode and the second ratio are active. At step 190, it can be detected once again whether the operating mode switch 64 has been activated. If yes, the system resumes to step 120. If no, the system checks whether the combined switch has been activated at step 200. If no, the ECU 56 computes at step 210 a preferred operating ratio by taking into account information relative to the machine as explained above. At step 220, it is determined whether this preferred ratio is the one active or not and if therefore a ratio change is needed. If no, the process resumes to step 190. If yes, the ECU 56 controls of the operating ratio change device to change from its present configuration to the other configuration at step 230 and then resumes to step 190.

If at step 200 it is determined that the combined switch has been activated, the system exits the full automatic operating mode to enter into a locked sub-mode, and the system proceeds to step 240 where the present operating ratio is determined. If present ratio is the first ratio, then the system simply proceeds to step 250 and locks the operating ratio change device in its first ratio configuration. If at step 240 the second ratio is the one which is active, then the system sets the operating ratio change device in its first operating ratio at step 245 and locks it in that ratio configuration at step 250. Then, at step 260 it is determined whether the combined switch 66 has been activated. If yes, this system the resumes to the full automatic mode, for example at step 210 as described above. If no, the system proceeds to step 270 where it is checked whether of the operating mode selector has been activated. If no, it resumes to step 260. If yes, it resumes to step 120.

It must be noted that the steps of checking the switches as explained above could be provided through an interrupt which would, at any point in the flow of the program, launch a corresponding procedure whenever one of the switches is activated.

As it derives from the above, the provision of an electronically controlled automated system to manage the operating ratio change system makes it possible to have a very sophisticated management of the ratio change strategy. Being based on the an electronic control units which can be connected electronically to exchange information with almost any component on board at the machine, it becomes possible to have a system where the machine always operates under optimum conditions for the work to be performed. Also, as shown above, the electronically controlled automated system can be provided with supplementary functions such as the ratio locking sub-mode or of the manual mode which further extend the ability of the skis steer loader to adapt its travel speed to the needs of the operator while performing a particular task.

Moreover, the system according to the invention can be further refined in order for example to be able to alter the transition process from a one ratio to another according to machine parameters received by the operating ratio change ECU. For example, in the embodiment detailed above it has been seen that the transition from one ratio to another is it essentially governed by the electro-proportional valve 55 which itself drives the hydraulically controlled proportional valve 54. Basically, depending on the switching pattern followed by the electro-proportional valve 55, the transition process from one ratio to the other will be more or less quick and more or less smooth. Therefore it can be advantageous to provide that to the operating ratio change ECU 56 drives the electro-proportional valve 55 in different ways depending on machine parameters such as the hydraulic fluid temperature and/or viscosity, and/or the engine speed and torque. The transition process could also be altered depending on whether the operating ratio change system is operating in manual mode or automatic mode.

The invention claimed is:

1. A skid steer machine having separate left and right hydraulic propulsion units, the machine comprising:
an operating ratio change system by which a ratio of the propulsion speed of at least one of the hydraulic propulsion units versus hydraulic flow directed to the propulsion units can be changed from at least a first ratio to a second ratio and inversely, the operating ratio change system comprising an operating ratio change ECU which controls an operating ratio change device to operate in at least a first ratio configuration or a second ratio configuration, and the operating ratio change system operating in an automatic operating mode where the operating ratio change ECU selects the operating ratio according to machine parameters received by the operating ratio change ECU.

2. A skid steer machine according to claim 1, wherein, in automatic operating mode, the operating ratio change ECU computes a preferred operating ratio by taking into account information relative to one or several of:
hydraulic pressure delivered by one or several hydraulic pumps feeding the hydraulic propulsion units;
torque delivered by an engine driving hydraulic pumps;
hydraulic fluid temperature and/or viscosity;
engine speed;
a difference between effective engine speed and an engine speed set-point.

3. A skid steer machine according to claim 1, the operating ratio change system comprising a ratio locking selector which is electronically connected to the operation ratio change ECU to force the operating ratio change device into a first ratio configuration and/or lock the operating ratio change device in the first ratio and/or unlock the operating ratio change device.

4. A skid steer machine according to claim 1, wherein the operating ratio change system can operate in a manual operating mode wherein a machine operator selects the operating ratio to be implemented by acting on an operating ratio selector which is electronically connected to the operating ratio change ECU to shift the operating ratio change device from a first ratio to a second ratio configuration or inversely.

5. A skid steer machine according to claim 4, the operating ratio change system comprising an operating mode selector which is electronically connected to the operating ratio change ECU to select either a manual operating mode or an automatic operating mode of the operating ratio change system.

6. A skid steer machine according to claim 3, wherein the operating ratio change system can operate in a manual operating mode wherein a machine operator selects the operating ratio to be implemented by acting on an operating ratio selector which is electronically connected to the operating ratio change ECU to shift the operating ratio change device from a first ratio to a second ratio configuration or inversely, and the operating ratio selector and the ratio locking selector are implemented as a single combined operating ratio and ratio locking selector.

7. A skid steer machine according to claim 6, wherein the operating ratio and/or the ratio locking selector comprise a biased switch.

8. A skid steer machine according to claim 3, the operating ratio selector and/or the ratio locking selector is foot-actuated by a machine operator.

9. A skid steer machine according to claim 1, wherein the operating ratio change ECU is able to alter a transition process from one ratio to another according to machine parameters received by the operating ratio change ECU.

10. A skid steer machine according to claim 1, the operating ratio change system comprising two operating ratio changing devices, each associated with one of the hydraulic propulsion units.

11. A skid steer machine according to claim 1, wherein each propulsion unit comprises a dual capacity hydraulic motor which is hydraulically connected in closed circuit to a variable capacity pump driven by an engine.

12. A skid steer machine according to claim 11, wherein the operating ratio change device acts on the hydraulic motor to change its capacity.

13. A skid steer machine according to claim 1, the operating ratio change device comprising an electro-proportional valve which is driven by the operating ratio change ECU.

14. A skid steer machine according to claim 1, wherein each propulsion unit comprises an endless track member or a series of synchronous non deflectable wheels.

* * * * *